United States Patent [19]

Wilson et al.

[11] Patent Number: 5,008,142

[45] Date of Patent: Apr. 16, 1991

[54] EMBEDDED LENS RETROREFLECTIVE SHEETING WITH FLEXIBLE, DIMENSIONALLY STABLE COATING

[75] Inventors: Bruce B. Wilson, Mounds View; Raymond E. Grunzinger, New Scandia Township, Washington County, both of Minn.

[73] Assignee: Minnesota Mining and Manufacturing Company, St. Paul, Minn.

[21] Appl. No.: 239,950

[22] Filed: Sep. 2, 1988

[51] Int. Cl.$^5$ .......................... G02B 5/128; B05D 5/06
[52] U.S. Cl. .................................. 428/203; 428/204; 428/325; 428/913; 428/460; 428/463; 525/186; 525/903; 40/205; 427/163; 427/204; 350/105
[58] Field of Search ............... 428/500, 203, 204, 325, 428/460, 463, 903

[56] References Cited

U.S. PATENT DOCUMENTS

| | | | |
|---|---|---|---|
| 2,407,680 | 9/1946 | Palmquist et al. | 88/82 |
| 3,795,435 | 3/1974 | Schwab | 350/105 |
| 4,367,920 | 1/1983 | Tung et al. | 350/105 |
| 4,505,967 | 3/1985 | Bailey | 428/164 |
| 4,511,210 | 4/1985 | Tung et al. | 350/105 |
| 4,569,857 | 2/1986 | Tung et al. | 427/163 |
| 4,648,932 | 3/1987 | Bailey | 156/276 |
| 4,664,966 | 5/1987 | Bailey et al. | 428/203 |

OTHER PUBLICATIONS

Thomas, D. A. and Sperling, L. H., "Interpenetrating Polymer Networks" *Polymer Blends* Paul, D. R. and Newman, Seymour (Ed.) Ch. 11, vol. 2, 1978, pp. 2-33.
Frisch, H. L. et al., "Tangled Polymers", CHEM-TECH, Mar. 1977, pp. 188-191.
Barlow, J. W., and Paul, D. R., "Polymer Blends and Alloys-A Review of Selected Considerations", *Polymer Engineering and Science*, Oct., 1981, vol. 21, No. 15, pp. 985-996.
Sperling, L. H., Interpenetrating Polymer Networks and Related Materials, 1981, Chp. 1, pp. 1-10.

*Primary Examiner*—P. C. Sluby
*Attorney, Agent, or Firm*—Douglas B. Little; Walter N. Kirn; Gary L. Griswold

[57] ABSTRACT

A curable polymer composition for use in providing a dimensionally stable coating comprises a semi-interpenetrating polymer network. The semi-interpenetrating polymer network includes a reactive polymer component, cross-linking agent, and non-reactive polymer component. The non-reactive polymer component has a molecular weight of about 7,000-30,000, and preferably about 15,000. In preferred embodiments, the reactive polymer has a molecular weight of about 30,000-200,000, and preferably about 40,000-60,000. Spacecoat compositions made with formulations described, exhibit good long-term stability, and resistance to failure upon embossing of a substrate to which the retroreflective sheeting is applied.

3 Claims, 1 Drawing Sheet

EMBEDDED LENS RETROREFLECTIVE SHEETING WITH FLEXIBLE, DIMENSIONALLY STABLE COATING

FIELD OF THE INVENTION

The present invention concerns polymer compositions, and in particular, polymer compositions usable in applications wherein dimensional stability is important. The compositions of the present invention are particularly well-suited for use as spacecoat material in retroreflective sheeting or the like. More specifically, the invention concerns polymer coatings usable as a spacecoat between reflector and lens in an enclosed lens retroreflective sheeting application.

BACKGROUND OF THE INVENTION

Enclosed lens retroreflective sheeting generally comprises reflective sheeting having a polymer matrix thereon, with glass beads embedded in the matrix. A mirror or reflective surface, generally formed from a metallic vapor coat or the like, is formed on a back side of the polymer./bead composite. In typical operation, light passes through the beads, which individually act as lenses focusing the light and directing same against the mirror surface. The light is then reflected back through the beads, and toward the source. Typically, the mirror surface is separated from the glass beads by a spacing layer coat or spacecoat, which provides for a preferred focal length between the beads and the reflective surface. It is noted that one reason such embedded lens arrangements are useful, is that incident light rays are focused onto the reflective layer irrespective of whether the front of the sheeting is wet or dry.

The elements of a typical enclosed or embedded lens retroreflective sheeting are: lens arrangement (beads imbedded in polymer), spacing layer (spacecoat), and reflector surface (vapor coat). The sheeting may include other elements such as an outer protective layer, and/or an adhesive layer for mounting. Herein the term "spacecoat" is meant to generally refer to the resin which provides for a separation between the embedded lenses and the reflective coat, regardless of the process of formation. The end product will generally be referred to as an enclosed (or embedded) lens retroreflective sheeting, again regardless of the process of its formation.

In a typical application, the reflective surface is formed as a layer having a plurality of cupped or concentrically coated portions or concave portions, one each of which is in association with each bead or embedded lens. The concentrically coated portions facilitate a desired reflection of light which has passed through the lenses, regardless of the direction from which the light initially impinges onto the sheeting. In part, the cupped construction of the mirrored surface ensures that much of the light reflected by the retroreflective surface is directed back toward the source.

Enclosed lens retroreflective sheeting and the use of glass beads to provide for reflex light reflectors are described in Palmquist et al., U.S. Pat. No. 2,407,680; May, U.S. Pat. No. 4,626,127; Tung et al., U.S. Pat. No. 4,367,857; Tung et al., U.S. Pat. No. 4,511,210; and, Tung et al., U.S. Pat. No. 4,569,920; these references being incorporated herein by reference.

From the above, it will be apparent that the nature of the spacecoat is very important. In particular, the spacecoat must be of a material than can be precisely applied, and which will be dimensionally stable in use. By "precisely applied" it is meant that application with precise control of thickness and conformation to the beads is obtainable. By "dimensionally stable" it is meant that the spacecoat should be sufficiently strong and durable (i.e. stable) over time, to maintain proper spacing and relative orientation between the individual glass beads, and the cup-shaped reflective surface. Any substantial deformation of the spacecoat, will lead to significant reduction in reflective ability (or power) of the retroreflective material.

In a typical application, enclosed lens retroreflective sheeting is applied to a substrate, such as wood, plastic, or metal, typically used to form a highway sign, license plate, or safety sign. Retroreflective material, when so applied, makes the objects formed from the substrate more conspicuous at night.

In some instances, it is desired to emboss a substrate having a retroreflective surface thereon. For example, a sheet of metal license plate material having a reflective surface thereon may be embossed to provide for conspicuity. Typically, the embossed letters or numbers are painted or otherwise colored to provide for greater contrast with reflective background. In some instances the colored symbols may be covered by an outer layer of a transparent thermosetting polymeric resin.

If the spacecoat is not substantially dimensionally stable, significant loss of reflective ability will occur as a result of the embossing. Also, exterior durability will diminish That is, the spacecoat will tend to crack, wrinkle, split, fracture or peel, along points of a stress associated with the embossing. It is noted that the same would be likely for any substantial bending of the substrate, not merely for embossing.

Past polymeric compositions used for spacecoats have been less than completely acceptable with respect to this dimensional stability. That is, substantial distortion of the reflective surface readily occurs, especially if embossing or the like is conducted on the coated substrate. This has led to substantial loss of reflective power for the retroreflective surface. Further, cracks or splits associated with the embossing have formed sites at which deterioration of the retroreflective surface can begin to occur, leading to a shorter product lifetime than desirable. What has been needed has been a polymer composition which provides for relatively high dimensional stability of the spacecoat.

It will be readily understood that a polymer composition which provides for the above related characteristics when used as a cured spacecoat would probably have utility in other, non-embedded lens, applications wherein dimensional stability is important.

SUMMARY OF THE INVENTION

According to the present invention, a preferred polymer composition is provided for use in applications wherein long term dimensional stability and ability to withstand lateral stress are important. In particular, the composition is well suited for use as a spacecoat, in an enclosed lens retroreflective sheeting application.

Polymer compositions according to the present invention are generally semi-interpenetrating polymer network (semi-IPN) systems, when cured. A semi-IPN composition enables the coating to endure non-linear stress without substantial fracture, while also providing appropriate dimensional stability for long term brightness retention.

As previously suggested, spacecoats should exhibit sufficient optical clarity (transmission) for operation. The specific level of acceptable transmission will depend in part upon application. Typically at least about 80% transmission, as measured by the method of ASTM D-1003, is preferred for application in license plate and highway sign coatings. Some typical components for use in semi-IPN's usable to obtain such a level of transmission are described in the experiments below.

Preferred compositions according to the invention include a reactive component in association with a cross-linking agent. Preferably the combination is one that can be readily, selectively, and substantially (e.g. >90%) cured, in relatively little time. In this manner, dimensional stability of the "spacecoat" is facilitated.

Inter-penetrating polymer networks (IPN's) are mixtures of two or more distinct polymer phases that cannot be completely physically separated. Semi-IPN's are polymer blends in which only one of the polymer components is substantially reacted or cross-linked. See, for example, Barlow, J.W., et al., "Polymer Blends and Alloys -A Review of Selected Considerations", *Polymer Eng. and Science*, Vol. 21, No. 15 p. 985–996 (Oct. 1981); "Tangled Polymers", *CHEMTECH*, March 1977 (p. 188–191); and, *Polymer Blends Vol. 2*, Ed. by D.R. Paul and S. Newman, Academic Press, Inc. (1978); these references being incorporated herein by reference.

Semi-IPN's usable according to the present invention, include: the substantially cross-linked or reactive polymer (cross-linked by the cross-linking agent); and, substantially non-cross-linked or non-reactive polymer, wherein the molecular weight of the reactive polymer is preferably within the range of 30,000 to 200,000 (weight average molecular weight), and wherein the non-reactive polymer is substantially extractable, i.e. is at least 40% extractable, from the cured composition. For such compositions, the nonreactive polymer is preferably of a structure allowing it to effectively plasticize the cured, reactive polymer. That is, the presence of the non-reactive, extractable, plasticizing polymer leads to a blend which, although dimensionally stable, can sufficiently deform so as to accommodate embossing or similar stresses to the substrate on which the retroreflective sheeting is applied. Preferably, the reactive polymer provides for a substantial cross-link density, in order to facilitate dimensional stability.

Herein the term "non-reactive polymer" and variants thereof is meant to refer to material which, when the semi-IPN is formed, is still substantially (>40%) extractable therefrom. That is, the non-reactive polymer does not substantially react with the crosslinking agent. The term "reactive polymer" and variants thereof is meant to refer to the cross-linked component, not substantially extractable upon cure.

It is important to obtain relatively rapid, substantially complete, cure of the reactive polymer, during initial stages of construction of a retroreflective sheeting surface in accordance with the present invention. A reason for this is that if cure is not substantially complete before the reflective layer is applied, but rather cure continues to run after the reflective layer is applied, distortion of the spacecoat, resulting from the cross-linking reaction and leading to loss of reflective ability, may occur. Also, slow cure leads to inefficiencies during production.

In preferred applications, the non-reactive polymer is a polymer component having a weight average molecular weight of about 7,000–30,000, and preferably about 15,000. Most preferably, the non-reactive polymer component has relatively little functionality associated therewith, that can be involved in the cross-linking reactions. Typically, this requires a cross-linkable functionality for the non-reacting polymer of no greater than about 2–10 per 15,000 weight average molecular weight of polymer. Typical non-reacting polymers for use in compositions according to the present invention include: polyesters, polyethers, polyamides, polyurethanes and some polymers of ethylenically unsaturated monomers. Preferred polymers are polyesters, and preferred polyesters include polycaprolactones (typically hydroxy terminated), and polymers derived from 2,9- and 3,10-bis(hydroxymethyl)tricyclo[$5.3.2^{6,8}.0^{1,8}$]-decane (such as available under the tradename Hüls LTWS, from Hüls America, Piscataway, N.J. 08855). Mixtures of materials may be used as the non-reactive polymer or polymer component.

As used herein, the term "weight average molecular weight" shall be understood as referring to molecular weight as determined by conventional gel permeation chromatography (gpc) methods. Further, when referring to polymer material, the term "molecular weight" as used herein shall be understood as referring to weight average molecular weight.

Preferably the reacting or reactive polymer is a cross-linkable polymer component capable of substantial, relatively rapid cross-linking. Typical reactive polymers usable in compositions according to the present invention include: polyvinylacetals such as polyvinyl formal and polyvinylbutyral; acrylic copolymers; polyurethanes; polyesters; polyamides, polyester-amides and acrylic block and graft copolymers. Mixtures of materials may be used as the reactive polymer or polymer component. A preferred reactive polymer material is a polyvinylbutyral resin having a molecular weight (weight average) of about 45,000–55,000. Two such materials are available under the tradename Butvar®, from Monsanto Polymer Products Co, St. Louis, Missouri, 63167, as Butvar® B-76 and Butvar® B-90. It is noted that while the preferred materials listed are hydroxy-functional, other functional groups for crosslinking may be used.

A variety of cross-linkers, or cross-linking polymers, may be utilized in association with polymer compositions according to the present invention. In general, what is required is at least a di-functional material, exhibiting useful properties for relatively low temperature curing applications. Mixtures of materials may be used as the cross-linker.

Preferably, the cross-linker is one which reacts relatively rapidly, to lead to substantially complete cure in relatively little time. It is preferred, though not required, that the cross-linker be one which can react at an appreciable rate in the presence of little or no catalyst. Typical cross-linkers usable in compositions according to the present invention include: aminoplast resins such as: urea-formaldehyde resins; melamine-formaldehyde resins; glycourilformaldehyde adducts; and, acrylic copolymers containing etherified adducts of the reaction product of acrylamide and formaldehyde. Cross-linkers could also include: polyfunctional aziridines; epoxy resins; isocyanates; aldehydes; azlactones and/or any other polyfunctional material whose functional groups are reactive with the functional groups of the reactive polymer. Preferred cross-linkers are methoxymelamine resins, such as for example, Resimene® 717 and 730, Monsanto Co., St. Louis, Missouri, 63167.

The drawings constitute a part of the specification, and include exemplary embodiments of the invention. In some instances, relative material thicknesses and component sizes may be shown exaggerated, to facilitate an understanding of the present invention.

DETAILED DESCRIPTION OF THE INVENTION

The present invention concerns a polymer blend usable for example as a preferred spacecoat to form an embedded or enclosed lens retroreflective sheet for a substrate. Such coated substrates, for example, can be fabricated into license plates or the like. In the embodiment described, the substrate comprises a metal sheet, for example, a metal license plate blank. However, polymer blends according to the present invention may be utilized in any of a variety of applications, especially including those wherein good dimensional stability of the cured polymer and capability of accommodating bending or embossing of the substrate, are required. While the invention broadly concerns a preferred polymer blend, usable in many applications, a particular application with respect to a license plate will be described in detail, in order to facilitate an understanding of the need for a composition having the physical and chemical characteristics of preferred compositions according to the present invention.

APPLICATION OF THE INVENTION TO A LICENSE PLATE

Figure 1:
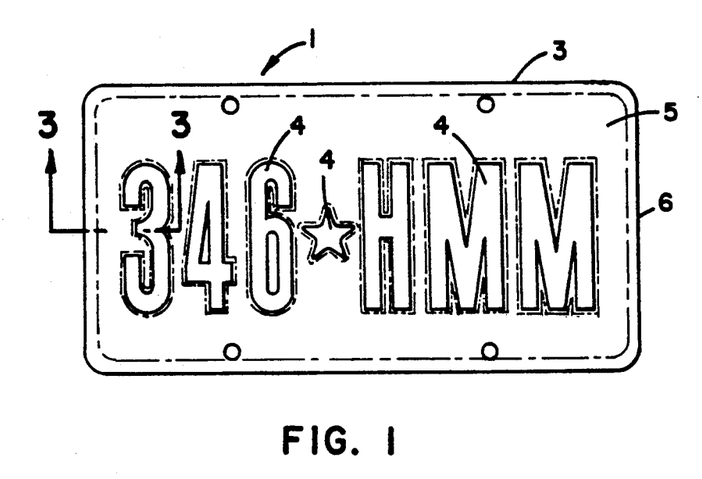
FIG. 1 is a top plan view of a license plate having an enclosed lens retroreflective coating thereon, according to the present invention.
Figure 2:
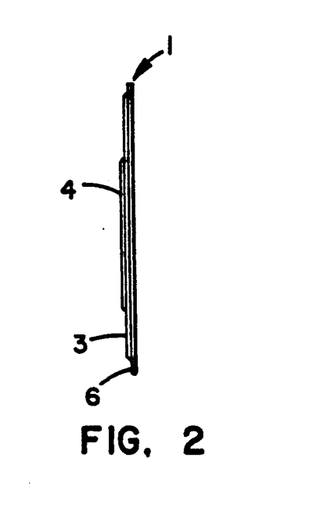
FIG. 2 is a side elevational view of the license plate shown in FIG. 1.
Figure 3:
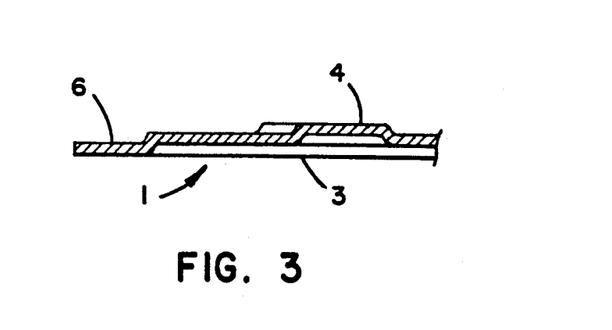
FIG. 3 is an enlarged fragmentary side cross-sectional view taken generally along line 3-3, FIG. 1.

The reference numeral 1, FIG. 1, generally designates a license plate having a retroreflective coating, including a spacecoat according to the present invention thereon. The license plate 1 generally comprises a metal substrate 3, formed from aluminum or the like, having characters 4 embossed therein. The characters 4 are generally embossed such that they are raised, i.e. project outwardly, from surface 5 of license plate 1; that is, they project toward the viewer. This will be better understood by reference to FIG. 2. Typical, conventional, embossed license plates carry characters thereon which are embossed, relative to the remainder of substrate 3, a total of at least about 60-80 mils. (0.15-0.20 cm). It is noted that license plate 1 includes an outer border 6 debossed away from the viewer, FIG. 1. Although the present invention is primarily described with respect to applications concerned with embossed letters, it will be understood that similar concerns and problems are involved with debossed symbols are involved.

In general, it is desirable that at least portions of surface 5 be substantially reflective, so that the license plate 1 will be very conspicuous, even at night and when viewed from a considerable distance. In general it is desirable to provide a license plate 1 which is very strongly retroreflective, so that it can be seen from a considerable distance, with only a small amount of light directed thereon. Further, an embedded lens arrangement is useful at least in part because good reflection is obtained under both wet and dry conditions.

In general, what is needed is a retroreflective sheeting at surface 5 of license plate 1. A commonly used type of such a sheeting is an enclosed lens retroreflective sheeting, which can be readily applied to, or laminated on, surface 5. Such sheeting is well-known, and one is generally represented, schematically, in cross-section in FIG. 4.

Figure 4:
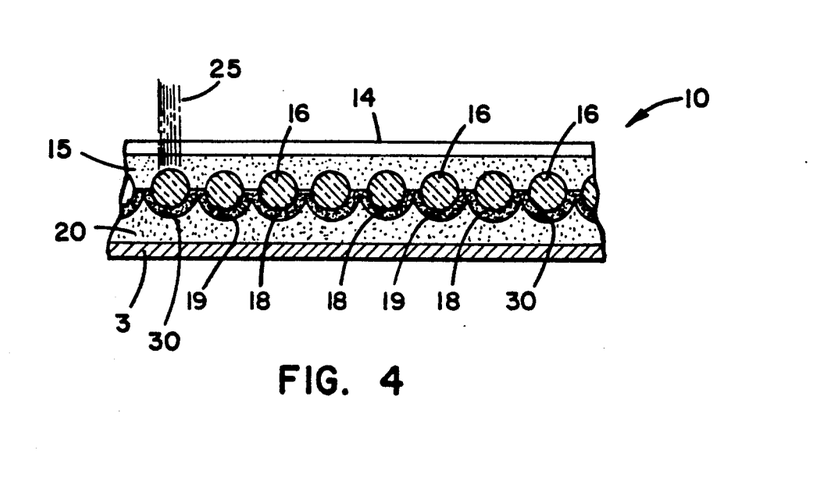
FIG. 4 is an enlarged, fragmentary, cross-sectional view of a portion of substrate having an embedded lens retroreflective coating thereon.

Referring to FIG. 4, substrate 3 is depicted as having sheeting 10 applied thereto. The sheeting 10 comprises a plurality of materials. In particular, sheeting 10 includes an outer protective coating (top layer) 14, a resin layer 15 including a monolayer of beads (lenses) 16 therein, spacecoat 18, reflective surface 19 and an adhesive layer 20.

Still referring to FIG. 4, typical operation of enclosed lens sheeting 10 will be understood. Light, for example, may enter sheeting 10 along the direction indicated by paths 25. As the light passes through any given lens 16, it is focused thereby, onto reflective surface 19. The light is then reflected off of surface 19, back through beads 16, and outwardly from sheeting 10. Thus, beads 16 generally act as lenses. While the beads 16 in FIG. 4 are all shown of about the same size, there is no requirement that they be so.

The reflective surface 19 includes a plurality of recesses, cavities or cups 30 therein, each cup 30 being centered with respect to an associated bead 16. The cups 30 are preferably spherical in curvature, so that a relatively constant distance between reflective surface 19, and any associated bead 16, is maintained. That is, the cups 30 collectively define a "concentric" or "concentrically applied" coating. With such a preferred curvature, and a selected distance of separation between each bead 16 and its associated cup 30, a high degree or power of reflection can be obtained. In general, a preferred, constant, distance is maintained between the center of each bead 16 and its associated cup 30 in the reflective surface 19. For preferred applications, the distance between the outer surface of each bead 16 and its associated cup 30 is between about 0.2 and 0.6, and preferably about 0.4, times the radius of the beads 16. Typically the beads 16 have a radius of about 20-100 micrometers. Beads or lenses having a refractive index of about 2.2-2.3 are typically used in embedded lens arrangements.

Maintenance of a selected distance for any given application is important, as the distance provides for appropriate focusing between the lenses (i.e. the beads or spheres 16) and the reflective surface 19. Thus, the light is readily focused, and a high degree or power of reflection of that light occurs.

The spacecoat 18, then, provides for numerous important characteristics. First, the spacecoat 18 generally comprises a resin surface providing for and maintaining selected orientation between spheres 16 and associated cups 30. That is, spacecoat 18 maintains the selected necessary, and constant, spacing. Further, reflective surface 19 is typically a reflective metal surface prepared by vapor deposition of metal onto a plurality of convex bumps formed in spacecoat 18 during a process of manufacture of sheeting 10.

The dimensional stability of cured spacecoat 18 is very important. If the spacecoat 18 changes conformation, after manufacture, the reflective power of sheeting 10 will decrease. For example, if spacecoat 18 is not sufficiently stable, the cupping may change, and the reflective surface 19 may wrinkle or buckle. Any of these deformations can damage sheeting 10 such that its reflective power is lessened.

It is also important that spacecoat 18 be stable with respect to further chemical reaction. Generally, spacecoat 18 is formed from cured polymeric resin. If cure is not substantially complete during early stages manufacture, i.e. before application of the reflective coat or surface 19, and cure is not readily controllable, a continued, slow, curing may take place after reflective surface 19 is applied. Should cure continue even after the reflective surface 19 is applied to the spacecoat 18, the result may be a substantial loss of reflective power due to change in conformation of the spacecoat during the further cure. In particular, as the resin material cures, it often changes in volume. Once the reflective surface 19 is applied to spacecoat 18, should the spacecoat 18 continue to change volume (i.e. continue to cure), the reflective surface 19 may contract and crack, again with the result being a loss in reflective power of sheeting 10. From this, it will be understood that generally it is preferred to provide a resin for spacecoat 18 which is not only dimensionally stable, but which is substantially completely cured within a relatively short period of time during manufacture, so that the likelihood of substantial continued curing taking place after the reflective surface 19 is applied is minimal, and/or production is not delayed. From these stated requirements, it will be apparent that in many ways it is desirable to have a spacecoat which is heavily cross-linked (has a high cross-link density) and is relatively rigid and inflexible, once cured. Indeed, in some applications, such spacecoats function well. However, in applications such as for license plates, deformation of the substrate 3, from the planar, after application of sheeting 10, is commonly required. For example, when characters 4 are embossed into substrate 3, the sheeting 10 in the area of the embossed characters 4, is deformed, or bent, considerably. If the spacecoat 18 is of relatively rigid, highly cross-linked material, it will fracture, crack or split under stress, and will not deform with the substrate bends used in forming the embossed characters 4. This will lead to loss of reflective power. Also, such splitting or cracking may lead to weak portions of sheeting 10, and eventual premature peeling of portions of sheeting 10 from license plate 1. It is noted that such fracturing, cracking or splitting is most likely to occur where bends are the greatest, and stress on spacecoat 18 is maximal.

In order to accommodate a substrate 3 which is deformed during use, it is desirable that the spacecoat 18 be formed from a resin capable of substantial dimensional stability, but which at the same time has an appropriate tensile strength and elongation, low glass transition temperature, and similar physical characteristics so that it can be readily applied and deformed without fracture, shear, crack, peel or similar problems. It would be most desirable to have a spacecoat usable such that when sheeting 10 is deformed, substantial loss of reflective power, at most, only occurs in the reflective surface 19 at the most extreme bends or deformations. That is, very little reflective power is lost, even in the vicinity of the sheeting adjacent the deformation, bend, embossed character, etc.

To achieve the above characteristics in a spacecoat, according to the present invention a polymer blend is used as the spacecoat 18. More specifically, a semi-interpenetratinq polymer network (semi-IPN) is provided. Such a network includes a highly cross-linked or reactive polymer component, which provides much of the dimensional stability of the resin or network. The reactive component is generally linked, by means of a conventional cross-linking agent or cross-linker. Preferably a relatively reactive cross-linker is used, so that nearly complete cure rapidly occurs. Herein the highly cross-linked component will be referred to as formed from a "reactive" or "reacting" polymer or resin component.

The other major component of the semi-IPN is a "non-cross-linked", "non-reacting" or "non-reacted" polymer. That is, the second polymer component, while it is somewhat trapped within the overall polymer network, is not substantially cross-linked with the first polymer component. Further, the second polymer is not substantially cross-linked with itself. In general, the non-reacting polymer is substantially extractable, i.e. is at least 40% extractable, from the cured polymer as defined below.

It will be understood that mixtures of material can be utilized as the reactive component, the crosslinking agent and/or the non-reactive component. In general, all that is required is overall characteristics of the components as described.

Preferred resin compositions for use in spacecoats according to the present invention include the following: a first polymer component comprising a reactive polymer; and, a second polymer component which is substantially non-reactive, extractable from the cured resin up to at least 40%, and which has a weight average molecular weight within the range 7,000 to 30,000. In use, compositions according to the present invention will also include a cross-linking agent, or cross-linker, as described in further detail below.

Referring to each of the components individually:

THE REACTIVE POLYMER

As previously suggested, desired characteristics of the reactive polymer include that: it can be cross-linked in the presence of the non-reactive polymer; it is capable of providing for high dimensional stability; and it can be readily applied as a coating, with ability to control, very precisely, the thickness of the coating and the conformation of the coating. A mixture may be used as the cross-linkable polymer.

Preferred reactive polymers have a weight average molecular weight between about 30,000 and 200,000, and preferably about 40,000–60,000. A relatively high degree of cross-linkable functionality, typically hydroxy functionality, in order to provide for substantial cross-linking, is preferred. A hydroxyl number of 100–200 as defined by ASTM standard D-1396, has been found for at least two useful reactive polymers, Butvar ® B-76 and Butvar ® B-90, described below.

Typical polymers which include appropriately reactive hydroxy moieties include polymers, or copolymers, which include polyvinylacetals and/or polyesters.

A list of useful materials for the reactive polymer was provided in the SUMMARY above. A particular, preferred, class of materials usable as the reactive polymer, comprises polyvinyl acetal resins. Within the molecular weight range stated above, such materials are easily handled, as they are powders at STP (Standard Temperature and Pressure). One useful, commercially available, class of polyvinyl acetal resins (more specifically polyvinyl butyral resins) is sold under the marx Butvar ® (Monsanto, St. Louis, Missouri, 63167). A particularly useful Butvar ® material is B-76, which has a weight average molecular weight of about 45,000–55,000, and a hydroxy content, expressed as percent polyvinyl alcohol, of about 9.0–13.0%. Butvar ® B-76 is a random polymer containing the elements of vinyl alcohol, vinyl butyral and vinyl acetate. Another useful material is Butvar ® B-90, a polymer containing the same elements and which has a weight average molecular weight of 38,000–45,000, and a polyvinyl alcohol content of 18–20%.

THE CROSS-LINKING AGENT

A variety of cross-linking agents may be utilized with reactive polymers, in compositions according to the present invention. In general, what is required is a cross-linking agent which will readily react with the reactive moieties of the cross-linking polymer, and which will provide for a substantial amount of cross-linking, i.e. is at least di-functional with the desired physical characteristics of the final composition. A cross-linking agent which can react at relatively low temperatures, on the order of 200° F. to 300° F. (93°C.–149° C.) is preferred. Further, for many applications it is preferred to use an agent which does not substantially react at room temperature. In this manner, a storage stable composition may be prepared with the cross-linking agent therein.

It is further desirable that the cross-linking agent be such that reaction with the reactive polymer can be efficiently carried to substantial completion. By "completion" as used in this context, it is meant that polymer cure to a stage whereat relatively little further reaction causing change in volume or conformation will occur. That is, a hard, cured, dimensionally stable coat is obtained. A reason for this, as suggested above, is to ensure that after the reflective layer is applied to the spacecoat, the spacecoat will not substantially shrink or otherwise deform due to further cross-linking reaction therein.

Preferably, the reactive polymer is provided in substantial excess relative to the cross-linker or crosslinking agent. Typically, at least about 10% excess equivalents of the reactive functionality on the reactive polymer to functional sites on the cross-linking agent should be used. This helps ensure substantially complete reaction in relatively little time.

The cross-linking agents (or cross-linkers) which exhibit the above, preferred, qualities include: aminoplast resins such as urea-formaldehyde resins; melamine formaldehyde; glycouril formaldehyde adducts; and, acrylic copolymers containing etherified adducts of the reaction product of acrylamide and formaldehyde. Cross-linkers can also include: polyfunctional aziridines; epoxy resins; isocyanates; aldehydes; azlactones and/or any other polyfunctional material whose functional groups are reactive with the functional groups of the reactive polymer. Methoxymelamine resins perform particularly well.

Two commercially available methoxymelamine resins, usable as cross-linking agents in compositions according to the present invention, are Resimene ® 717 and Resimene ® 730 (Monsanto Co., St. Louis, Missouri, 63167). Resimene ® 717 is a high solids methylated melamine crosslinking resin which can exhibit uncatalyzed curing at as low as 250 degrees Fahrenheit (121° C.), and catalyzed curing at as low as 200 degrees Fahrenheit (93° C.). High cross-linking efficiency is exhibited by this compound. It is compatible with a great many solvents, including ketones, esters, alcohols, glycol ethers and aromatic hydrocarbons, and it has some limited compatibility with aliphatic hydrocarbon solvents. It is noted that Resimene ® 717 (in its monomeric form) is tri-functional, i.e. it includes three reactive sites for cross-linking. Further, the relatively short ether groups in Resimene ® 717 (methyl groups) help provide for a relatively rapidly acting cross-linking agent. Mixtures of materials may be used as the cross-linker.

THE NON-REACTIVE POLYMER

The non-reactive polymer is generally relatively low in functionality, with respect to the cross-linking agent, so it is not substantially chemically incorporated into the cross-linked resin. It is preferred that the non-reactive polymer included in the final polymer composition be such that it can be extracted from the cured polymer, at least about 40%, and preferably above about 70%. Further, it is preferred that the non-reactive polymer be such as will provide a plasticizing effect to the overall cured polymer. Mixtures of materials may be used as the non-reactive polymer or polymer component. Each material of the mixture, however, should independently satisfy the requirements for the non-reactive polymer.

It has been observed that those compositions which were made according to the experimentals listed below and which exhibited utility generally appeared to show some discontinuity, i.e. the non-reactive polymer appeared to at least partially form suspended crystal, in the reactive polymer.

Preferred non-reactive polymers are polycaprolactones. It has been observed that with such compounds, in the preferred molecular weight range, there is relatively little chemical incorporation of the nonreactive polymer into the polymer network, by reaction with the cross-linker, and the non-reacting material is readily extractable from the cured polymer.

As indicated by the following examples, it has been observed that the non-reactive polymer must, in general, have a molecular weight (weight average) of about 7,000–30,000, in order to be effective in compositions according to the present invention. Preferred polycaprolactones are those having a molecular weight of about 12,000–18,000, and most preferably about 15,000.

With respect to the molecular weight range, as the following examples indicate, relatively low molecular weight non-reactive agent (polycaprolactones), on the order of 3,000 molecular weight, can be used to form spacecoats that can be embossed relatively successfully. However, the brightness of the spacecoat in the embossed region was not found to be acceptable. Low brightness of this type is generally due to an overly soft spacecoat, which can deform under embossing with loss of concentricity (cupping). Alternatively stated, a significant amount of low molecular weight polycaprolactone results in an overall composition not having acceptable long-term dimensional stability.

Too high a molecular weight of non-reactive material (polycaprolactone) is also undesirable. As the experiments show, when a 40,000 molecular weight polycaprolactone was used, good wrinkle resistance and cupping were found; however, the sheeting did not accept embossing well. That is, the sheeting tended to fracture, crack and/or peel under a bending stress to the substrate.

Further, a blend of high molecular weight/low molecular weight non-reactive polymer (polycaprolactones) was also found to be undesirable. As the experiments show, the mixtures resulted in cured compositions which exhibited poor brightness retention, and which did not emboss well.

In general, to achieve a desired spacecoat, the semi-IPN polymer composition must have a non-reactive polymer of a molecular weight (weight average) somewhere between 3,000 and 40,000 and preferably within the range of about 7,000–30,000. Most preferably, the weight average molecular weight of the non-reactive polymer is about 15,000. An acceptable non-reactive polymer is Union Carbide P-300, a polycaprolactone having a molecular weight of about 15,000.

THE OVERALL FORMULATION

In general, polymer compositions according to the present invention, uncured, include, by weight, about 55–95% reactive polymer component, 5–20% cross-linker, and 2–25% non-reactive polymer component. Two preferred formulations comprise: a first formulation of 80–90% Butvar ® B-76, 5–15% Resimene ® 730 and 3–8% P-300; and, a second formulation comprising 85–95% Butvar ® B-90; 3–8% Resimene ® 717 and 3–8% Hüls LTW.

A particular preferred composition for use as a spacecoat according to the present invention comprises, by weight: 85 parts B-76, 10 parts Resimene ® 730 and 5 parts polycaprolactone P-300.

PREPARATION OF THE SPACECOAT FORMULATION

During preparation of the formulation, the reactive polymer is dissolved in an appropriate solvent system. It is noted that Butvar ® B-76 is a powder at STP.

A wide variety of solvents, or solvent systems, may be utilized. In general, mixtures of alcohols, glycol ethers, propylene glycol ethers, propylene glycol acetates, or ethylene glycol acetates are usable. A preferred solvent system comprises dipropylene glycol monomethyl ether. One such material is available under the trade name DPM from Dow Chemical, Midland, Michigan. Butvar ® B-76 and B-90 are readily soluble in DPM, if about 3 to 4 parts solvent are used per part Butvar ®, by weight. In general, the cross-linker can be added directly to the solvent system. That is, no further solvent is typically needed. The non-reactive polymer is generally dissolved in an appropriate solvent for accumulation with the other components of the space coat. Polycaprolactone plasticizers within the preferred weight average molecular weight range of 7,000–30,000 are readily soluble in DPM ®, Dow Chemical. For a typical application, the solution is made with 33% solids (by weight) and solvent heated to about 150° F. (66° C.) to effect solution of the polycaprolactone. The non-reactive polymer (plasticizer) solution is then added to the reactive polymer/cross-linker agent solution, with mixing. The final composition, in solvent, is storage stable at ambient conditions. It is noted that the reactive polymer and non-reactive polymer should be such that when mixed there is good miscibility and no substantial phase separation. That is, the reactive and non-reactive polymers should be compatible.

ENCLOSED LENS RETROREFLECTIVE SHEETING PREPARATION

A wide variety of specific processes are known for preparation of enclosed lens sheeting. In a typical process, a top film is coated onto a carrier web. The monolayer of beads is then attached to the top film, typically either: by coating a curable film onto the top film, and then covering this layer with the glass beads; or, by placing the beads directly onto the top film and heating the construction to provide adhesion. After the layer of beads is in place, the spacecoat is typically applied to the construction by casting and curing (coating). Preferred spacecoats according to the present invention can generally be applied in solutions comprising about 10–50%, and preferably about 18–40%, solids.

The construction is then heated to above 250° F. (121° C.) in order to cure the spacecoat and drive off the solvent. Following cure, the spacecoat is coated with the reflective layer. Generally, the reflective layer is a metal reflective layer approximately 1000 Å (0.0010 micrometers) thick. Typically, high vacuum deposition of a vaporized aluminum is used.

Finally, a layer of adhesive is typically added to the metal vapor coat, to provide for adhesion to the substrate (the license plate blank for example). The carrier web can then be removed, to provide for the finished sheeting. In some instances an outermost protective layer may be added.

EXPERIMENTALS

GENERAL TESTS FOR FUNCTION

In order to test dimensional stability with respect to withstanding embossing of the substrate, otherwise conventional retroreflective coatings, using polymer compositions described below for the spacecoat, were prepared and applied to an aluminum license plate blank, by means of a conventional pressure sensitive adhesive. The entire construction was then embossed in an hydraulic press, with a series of letters, as would be conventional for embossing a license plate. The evaluation was of the amount of embossing which the construction could endure without visible cracking of the spacecoat. In general, if the overall construction could withstand 100 mils (0.254 cm) of embossing, without visible signs of cracking, it was considered embossable. The time duration of the embossing operation was approximately one second, and was carried out at ambient temperatures.

More specifically, for the embossability tests, a conventional license plate blank, 6×12 inches and 0.06 inches thick (15.24×30.48 cm and 0.1524 cm thick) was used. After coating and cure, a sample embossment was achieved by placement between a male/female die pair with compression at a 3 bar for a duration of 1 second at ambient temperature. The die pair comprised a series of 5 "O's" progressing in height, at 10 mil increments, from 60 mil to 100 mil (0.025 cm increments from 0.1524 cm to 0.254 cm). Rating the response to embossment involved visual inspection of the letter edges for cracks. The resulting assigned values reflected the amount of embossment the construction could withstand, without fracture. An embossability of less than 100 mils (0.254 cm) was considered unacceptable.

While in some applications, substrates, such as license plates, having retroreflective sheeting thereon are normally embossed only to about 80 mils (0.20 cm), an embossability of less than about 100 mils (0.254 cm) was considered unacceptable for compositions according to the present invention. There are several reasons for this. First, some characters may, when embossed, cause greater stress, in localized area, to the coating than do the "O's" of the test. Secondly, it is preferred to have a "safety margin". That is, if a coating visibly shows cracking at 100 mils (0.254 cm) but not at 80 mils (0.20 cm), it can be assumed that even at the 80 mil embossing significant stress will have occurred, and points of failure not viewable may have occurred. Requiring the coating to test acceptable for embossability to 100 mils (0.254 cm) addresses such concerns.

The wrinkling resistance of spacecoats made using compositions according to the present invention was measured by microscopic analysis of the construction, both before and after afixing to a substrate. Wrinkling was generally initiated and accelerated, by heating the unmounted construction at 150 degrees Fahrenheit (65° C.) for a minimum of one hour. Visual inspection, aided by a 200x microscope magnification and top surface lighting, was used to examine for wrinkling.

SCALE USED TO REPORT CONCENTRIC-COATABILITY OR CUPPING

In the data reported for the following experimentals, a scale of 1 (best) to 9 (worst) was used to rate the concentric coatability. The scale is based upon the level of cupping observed in the applied spacecoat. Usually, high incidence of poor cupping is accompanied by substantial wrinkling. A value of about 6 or less is acceptable at least for some applications. Preferred compositions are those with a value of 4 or less.

| Scale | Observation |
| --- | --- |
| 1 | Easy to locate beads and voids between beads, sharp hexagonal reflection can be seen coinciding with the spaces between the beads. Vapor coated surface appears dark with sharp glare off the top of each spherical surface. |
| 2 | Easy to locate beads and voids between beads, the hexagonal pattern begins to break down and becomes less focused. The vapor coated surface still appears dark with sharp points of light off the top of the spherical surfaces. |
| 3 | Location of individual beads still possible, hexagonal pattern between beads is broken down. Observation of considerably greater glare. |
| 4 | Bridging between beads begins to occur. |
| 5 | General bridging between beads. It is difficult to locate some beads. |
| 6 | Bridging between beads is nearly continuous, individual bead identification becomes difficult. |
| 7 | Cannot locate many individual beads, bead clusters still visible. Very little depression between beads. |
| 8 | Very few locatable bead clusters, surface appears flat except for a few waves. |
| 9 | Virtually flat, no beads visible. |

Of course, with respect to compositions according to the present invention, preferred composition are those which show a value of 1 or about 1 on the cupping scale.

WRINKLING SCALE

In the data reported for the following experimentals, a scale of 1 to 9 was used to describe wrinkling. A value for wrinkling was assigned, according to the following guidelines. In general, a value on the wrinkling scale of about 6 or less is acceptable, at least for some applications. Preferred compositions exhibit a value of 4 or less.

| Scale | Observations |
| --- | --- |
| 1 | No wrinkling. |
| 2 | Very small incidence of isolated small ripples, typically located at top or edges of the spherical coating of polymer over glass bead. 1 wrinkle/30-50 beads, ¼ to ½ bead diameter long. |
| 3 | Isolated incidences of small wrinkles, wrinkling between beads may be longer. 1 wrinkle/10-20 beads, 0.5 to 1 bead diameter long. |
| 4 | General isolated wrinkling, increasing wrinkling incidents particularly between the beads. Begin to see multiple wrinkles. 1 wrinkle/1-5 beads, 0.5 to 2 bead diameter long. Some brightness lost. |
| 5 | Wrinkling begins to become continuous, multiple rippling particularly between beads. Wrinkles begin to climb up side of bead. 1+ wrinkle/bead, wrinkle length is anywhere from 0.25 diameter to several bead diameters. (There is significant brightness loss.) |
| 6 | General continuous wrinkles. Wrinkling is on top of bead, multiple wrinkling with some spherical surface left. |
| 7 | General continuous wrinkles covering the entire spacecoat. (Much of the brightness is gone, more than 50% reduction.) |
| 7 | General continuous wrinkling with the addition of "microwrinkles". Microwrinkles have a very small radius at the observed magnification of 200×. (There is little retroreflective brightness left in the sheeting.) |
| 9 | General microwrinkles. There is no brightness left in the sheeting.) |

ANALYSIS OF CROSS-LINKING

In order to test the nature of cured semi-IPN's made with polymer compositions according to the present invention, a soxhlet a extraction test was developed. In general, test spacecoat resin compositions were prepared, and coated onto a silicon-coated release liner, to give a final coating thickness of 1.5-2.0 mils (25-50 micrometers). The resultant coatings were placed in a 200 degrees Fahrenheit (93° C.) oven for 8 minutes, followed by placement for another 8 minutes in a 350 degrees Fahrenheit (177° C.) oven.

Small pieces (1-3 grams) of the film were prepared and weighed. Each piece was placed in an extraction thimble.

A soxhlet extractor with methylene chloride (dichloromethane) as the solvent, was used as a means to extract the soluble portion of the films. The residence time in the extractors for each sample/thimble was 4 days.

Determination of the amount of extractable mass was achieved by weighing the dried thimbles after extraction. The solvent, containing extractables, was concentrated, and analyzed by fourier transform IR, using conventional techniques. As will be apparent from the examples reported, in all instances of acceptable polymer non-reactive components were extractable, and therefore not involved in the cross-linking. On the other hand, most of the vinylacetyl polymer was not extractable, and therefore is considered to have been highly cross-linked.

THE MATERIALS

The reactive polymer used in most of the experiments was either Butvar ® B-76 or Butvar ® B-90 (Monsanto Co., St. Louis, Missouri, 63167), as (B-76 or B-90) indicated. In one comparative experiment Vitel PE307 was used. Vitel PE307 is a polyester prepared from ethylene glycol, neopentylglycol, isophthalic acid, terphthalic acid and sebacic acid. It is available from Goodyear, Akron, Ohio. Vitel has a weight average molecular weight of about 50,000.

A variety of polycaprolactone "tones" or "plasticizers" were used were used as non-reactive polymer. In particular, polycaprolactones having the molecular weights of 3,000; 15,000; and, 40,000 were used. The commercial products used were Union Carbide 0260, P-300 and P-700, respectively. In one comparative experiment Hüls LTW was used. This compound, previously identified has a weight average molecular weight of about 15,000. In another comparative example Aroplaz 1351 was used. Aroplaz 1351 is a non-oxidizing long oil alkyd resin having a weight average molecular weight of about 3,300, obtained from Spencer-Kellogg, Buffalo, N.Y.

The preferred cross-linking agent utilized were melamine resins, in particular, methoxymelamine resins. Two commercial products were used. These are Resimene® 717 (Monsanto Co., St. Louis, Missouri, 63167), and Resimene® 730 (Monsanto Co., St. Louis, MO 63167). Two other cross-linking agents, Cymel 301 and Cymel 1171 were used in comparative examples. Cymel 301 is a hexamethoxy methyl melamine-formaldehyde resin available from American Cyanamid, Wayne, N.J. Cymel 1171 is a glycouryl-formaldehyde adduct available from American Cyanamid. In another comparative experiment, Beckamine P138 was used. Beckamine P138 is a butylated ureaformaldehyde resin available from Reichold Chemicals, White Plains, N.Y. 10603.

In one comparative example, the resin included Vitel PE200D. Vitel PE200D is a polyester composed of ethylene glycol, neopentylglycol, isophthalic and terphthalic acids, available from Goodyear. This material has a weight average molecular weight of about 50,000 and was observed to be extractable.

EXPERIMENT 1—USE OF PLASTICIZER OF MODERATE MOLECULAR WEIGHT

A series of compositions using non-reacting polymer of moderate (7,000–30,000) molecular weight were made. The compositions were generally prepared in solution (25–30%) with butyl cellosolve or Dowanol DPM (Dow Chemical, Midland, Mi.). The compositions were used to form spacecoating in an embedded lens retroreflective sheeting, prepared according to the above-described general process. The sheeting was tested for embossability and wrinkling, according to the above described test procedures. Table I below presents the results for tests for embossability, and observations of concentric coatability and wrinkling according to previously described procedures. The figure used under embossability is an indication of the height, in mils, of the highest embossed character tested which did not show cracking, fracture or peel. Since the highest embossed character was 100 mils, where the number 100 appears in the embossability column, no indication is made whether or not a next higher embossed character would show cracking fracture or peel.

TABLE I

| Samp. No. | Polymer Comp. (% by weight) | Emboss-ability | *Conc.-coat. | Wrinkle Value |
|---|---|---|---|---|
| 1 | 60% B76 20% Resimene 717 20% P300 | 100 mils (0.254 cm) | 5 | 6 |
| 2 | 60% B76 20% Resimene 730 20% P300 | 100 mils (0.254 cm) | 6 | 6 |
| 3 | 85% B76 10% Resimene 730 5% P300 | 100 mils (0.254 cm) | 2 | 1-2 |
| 4 | 90% B76 5% Resimene 717 5% Huls LTW | 100 mils (0.254 cm) | 1 | 1 |
| 5 | 90% B76 5% Resimene 717 5% P300 | 100 mils (0.254 cm) | 1 | 1 |
| 6 | 90% B90 5% Resimene 717 5% Huls LTW | 100 mils (0.254 cm) | 1 | 1 |

*Concentric coatability

While the compositions of tests 3, 4, 5 and 6 are performed, it is believed that each of the defined compositions is acceptable with respect to embossability, concentric-coatability, and wrinkle value.

Composition 1 was studied, for extractable polymer, using the described soxhlet extraction procedure. The percent of the overall mass which could be extracted was about 37.3%. The composition of the extracted material was evaluated by IR to be 47%/13%/40% of B76/Resimene 717/P300. It was calculated that therefore, about 74% by weight of the non-reacting polymer (P300) was extractable.

EXPERIMENT 2—COMPARISON OF A COMPOSITION MADE WITH LOW MOLECULAR WEIGHT REACTIVE POLYMER

For comparison to the examples reported in Experiment 1, a composition using a low molecular weight (about 3,000) polymer as the non-reactive polymer (Union Carbide Tone 0260) was analogously prepared. Table II below reports the results using this composition.

TABLE II

| Samp. No. | Polymer Comp. (% by weight) | Emboss-ability | *Conc.-coat. | Wrinkle Value |
|---|---|---|---|---|
| 7 | 60% B76 20% Resimene 717 20% 0260 | 100 mils (0.254 cm) | 8 | 8 |

*Concentric coatability

It is apparent that when a low molecular weight non-reactive polymer was used, although a high degree of embossability was obtained, the resulting cured composition was not dimensionally stable. That is, it shows unacceptable concentric-coatability and unacceptable wrinkle value.

EXPERIMENT 3—COMPARISON OF A COMPOSITION MADE WITH HIGH MOLECULAR WEIGHT NON-REACTIVE POLYMER

For comparison to Composition Nos. 1–7, reported in experiments No. 1 and 2 above, a composition made with a relatively high molecular weight non-reactive polymer (40,000 molecular weight) was analogously prepared. Table III below reports the results.

TABLE III

| Samp. No. | Polymer Comp. (% by weight) | Emboss-ability | *Conc.-coat. | Wrinkle Value |
|---|---|---|---|---|
| 8 | 60% B76<br>20% Resimene 717<br>20% P700 | 80 mils<br>(0.20 cm) | 3 | 2 |

*Concentric coatability

It is apparent that with a relatively high molecular weight non-reactive polymer, lower embossability is obtained, although dimensional stability otherwise results.

EXPERIMENT 4-COMPARATIVE COATING MADE WITH A BLEND OF HIGH MOLECULAR WEIGHT AND LOW MOLECULAR WEIGHT NON-REACTIVE MATERIALS

A composition comprising a mixture of nonreactive polymer materials, the blend used for the mixture comprising both high molecular weight and low molecular weight non-reactive polymers, was analogously prepared. The results are reported in Table IV below.

TABLE IV

| Samp. No. | Polymer Comp. (% by weight) | Emboss-ability | *Conc.-coat. | Wrinkle Value |
|---|---|---|---|---|
| 9 | 60% B76<br>20% Resimene 717<br>10% P700<br>10% 0260 | 80 mils<br>(0.20 cm) | 8 | 7 |

*Concentric coatability

EXPERIMENT 5—COMPARATIVE COATINGS MADE WITH REACTIVE POLYMER OTHER THAN B76 AND/OR CROSS-LINKER OTHER THAN RESIMENE 717 OR 730

Further comparative examples are reported in Table V below. It is noted that none of the compositions shows both acceptable embossability and dimensional stability (as indicated by concentric-coatability or wrinkle value).

TABLE V

| Samp. No. | Polymer Comp. (% by weight) | Emboss-ability | *Conc.-coat. | Wrinkle Value |
|---|---|---|---|---|
| 10 | 60% B76<br>20% Cymel 1171<br>20% 0260 | 100 mils<br>(0.254 cm) | 8 | 8 |
| 11 | 35% Vitel PE307<br>12% Cymel 301<br>53% Vitel PE200D | 90 mils<br>(0.23 cm) | 4 | 3 |
| 12 | 63% B76<br>23% Beckamine P138<br>14% Aroplaz 1351 | 60 mils<br>(0.15 cm) | 7 | 5 |

*Concentric coatability

It will be understood that while certain specific embodiments of the present invention are related in the examples, these are merely exemplary, and the invention may be embodied in various forms.

What is claimed and desired to be secured by letters patent is as follows:

1. An embedded lens retroreflective sheeting comprising a resin matrix layer in which is partially embedded a plurality of bead lenses, a spacecoat comprising a light transmissive, polymeric layer on the side of the lenses not embedded in the resin matrix layer, and a reflective surface on the side of the spacecoat opposite the lenses; said spacecoat comprising a semi-interpenetrating polymer network which comprises:
    (a) a cross-linked reactive polymer component
    (b) a cross-linking agent which is at least di-functional with respect to reaction with reactive polymer component; and
    (c) a non-reactive polymer component having a weight average molecular weight of between about 7,000 and 30,000, and at least 40% of which can be extracted by solvent from said spacecoat.

2. A retroreflective sheeting according to claim 1 wherein:
    (a) said cross-linker is an eminoplast resin;
    (b) said reactive polymer component comprises polyvinyl acetal material; and
    (c) said non-reactive polymer component is polycaprolactone polymer having no greater than about 10 functional hydroxy groups per 15,000 weight average molecular weight.

3. A retroreflective sheeting according to claim 2 wherein:
    (a) said cross-linker is a methoxy methylated malamine,
    (b) said reactive polymer component is a polyvinyl butyral; and,
    (c) said non-reactive polymer component is hydroxy terminated polycaprolactone polymer.

* * * * *